United States Patent
Turner et al.

(10) Patent No.: US 9,216,401 B2
(45) Date of Patent: Dec. 22, 2015

(54) BELL COLUMN DOWNTUBE, REACTORS UTILIZING SAME AND RELATED METHODS

(75) Inventors: Terry D. Turner, Idaho Falls, ID (US); Dennis N. Bingham, Idaho Falls, ID (US); Bradley C. Benefiel, Idaho Falls, ID (US); Kerry M. Klingler, Idaho Falls, ID (US); Bruce M. Wilding, Idaho Falls, ID (US)

(73) Assignee: Battelle Energy Alliance LLC, Idaho Falls, ID (US)

( * ) Notice: Subject to any disclaimer, the term of this patent is extended or adjusted under 35 U.S.C. 154(b) by 1149 days.

(21) Appl. No.: 13/188,121

(22) Filed: Jul. 21, 2011

(65) Prior Publication Data
US 2013/0020236 A1  Jan. 24, 2013

(51) Int. Cl.
*B01J 19/32* (2006.01)
*C10G 27/04* (2006.01)
(Continued)

(52) U.S. Cl.
CPC .............. *B01J 19/2415* (2013.01); *B01J 4/002* (2013.01); *B01J 10/005* (2013.01); *C01B 3/384* (2013.01); *C10G 1/083* (2013.01); *C10J 3/57* (2013.01); *C10J 3/723* (2013.01); *B01J 2219/00157* (2013.01); *C01B 2203/0233* (2013.01); *C01B 2203/04* (2013.01); *C01B 2203/047* (2013.01); *C01B 2203/0475* (2013.01); *C01B 2203/06* (2013.01); *C01B 2203/1005* (2013.01); *C01B 2203/1041* (2013.01); *C01B 2203/1247* (2013.01); *C10G 2400/26* (2013.01);
(Continued)

(58) Field of Classification Search
CPC ................... B01J 19/2415; B01J 2219/00157; B01J 4/002; C10G 27/00; C10G 27/02; C10G 27/04

USPC ................... 208/3–7, 391; 422/162, 307, 500
See application file for complete search history.

(56) References Cited

U.S. PATENT DOCUMENTS

| 315,886 A | 4/1885 | Bailey |
| 2,371,477 A | 3/1945 | Souders et al. |

(Continued)

FOREIGN PATENT DOCUMENTS

CN  201634417 U  11/2010

OTHER PUBLICATIONS

Crosley, et al., Treatment of Waste by the Molten Salt Oxidation Process at the Oak Ridge National Laboratory, 1993, p. 1-11).*
(Continued)

*Primary Examiner* — In Suk Bullock
*Assistant Examiner* — Derek Mueller
(74) *Attorney, Agent, or Firm* — Holland & Hart, LLP

(57) ABSTRACT

Reactors for carrying out a chemical reaction, as well as related components, systems and methods are provided. In accordance with one embodiment, a reactor is provided that includes a furnace and a crucible positioned for heating by the furnace. A downtube is disposed at least partially within the interior crucible along an axis. At least one structure is coupled with the downtube and extends substantially across the cross-sectional area of the interior volume taken in a direction substantially perpendicular to the axis. A plurality of holes is formed in the structure enabling fluid flow therethrough. The structure coupled with the downtube may include a lower body portion and an upper body portion coupled with the lower body portion, wherein the plurality of holes is formed in the lower body portion adjacent to, and radially outward from, a periphery of the upper body portion.

16 Claims, 6 Drawing Sheets

(51) Int. Cl.
  *C10J 3/57* (2006.01)
  *B01J 19/24* (2006.01)
  *B01J 4/00* (2006.01)
  *B01J 10/00* (2006.01)
  *C10J 3/72* (2006.01)
  *C01B 3/38* (2006.01)
  *C10G 1/08* (2006.01)

(52) U.S. Cl.
  CPC .. *C10J2300/0913* (2013.01); *C10J 2300/0973* (2013.01); *C10J 2300/0986* (2013.01); *C10J 2300/1246* (2013.01); *C10J 2300/1807* (2013.01)

(56) References Cited

U.S. PATENT DOCUMENTS

| | | |
|---|---|---|
| 3,172,757 A | 3/1965 | Hess et al. |
| 3,252,774 A | 5/1966 | McMahon et al. |
| 4,017,271 A | 4/1977 | Barclay et al. |
| 4,028,059 A | 6/1977 | LaBelle, Jr. et al. |
| 4,092,236 A | 5/1978 | Heredy |
| 5,041,719 A | 8/1991 | Harris et al. |
| 5,569,434 A | 10/1996 | Devanathan et al. |
| 7,078,012 B2 | 7/2006 | Bingham et al. |
| 7,153,489 B2 | 12/2006 | Bingham et al. |
| 7,279,077 B2 | 10/2007 | Bingham et al. |
| 7,294,323 B2 | 11/2007 | Klingler et al. |
| 7,665,328 B2 | 2/2010 | Bingham et al. |
| 8,865,281 B2 | 10/2014 | Axelrad et al. |
| 2005/0000435 A1 | 1/2005 | Lee et al. |
| 2009/0074656 A1 | 3/2009 | Billings |
| 2011/0089377 A1 | 4/2011 | Bingham et al. |

OTHER PUBLICATIONS

International Search Report issued in PCT/US12/38260 on Oct. 16, 2012.
Supplementary European Search Report for corresponding European Patent Application No. 12814404.5, issued Nov. 5, 2014.
English translation of Search Report issued by the State Intellectual Property Office of the People's Republic of China for corresponding Chinese Patent Application No. 201280036147.5, dated May 7, 2015.

* cited by examiner

BELL COLUMN DOWNTUBE, REACTORS UTILIZING SAME AND RELATED METHODS

GOVERNMENT RIGHTS

This Invention was made under a Cooperative Research and Development Agreement between Western Hydrogen and Battelle Energy Affiance, LLC under Contract No. DE-AC07-05ID14517, awarded by the U.S. Department of Energy. The U.S. Government has certain rights in the invention.

TECHNICAL FIELD

The present invention relates generally to reactors used in the production of gasses and, more particularly, components and methods used in reactors such as alkaline metal reactors.

BACKGROUND

Hydrocarbon based fuels (including petroleum products, natural gas, etc.) have been, and remain, a major source of global energy production. Projections of global oil reserves, the desire to provide more "green" or environmentally friendly energy, and many other issues have motivated individuals, companies and governments to research possible energy production alternatives. These research and development efforts have included the search for improved techniques, systems and methods for producing energy from existing, known energy sources. For example, efforts have been made regarding the ability to extract oil located in geophysical locations that are difficult to reach using conventional technology. Additionally, efforts have been made to make existing energy processes more efficient, more cost effective, and more environmentally friendly.

Other efforts have focused on extracting energy from reserves that have largely been ignored in the past. In some cases, these resources or reserves have been ignored because they are not as carbon rich as other available resources. In other instances it is simply more difficult to convert the resource into a useable form of energy. For example, substantial efforts have been made to extract oil from sources such as tar sands and oil shale. While technically feasible, extraction of oil from such sources in the past has conventionally been considered inefficient and ecologically unfriendly.

Current research has also focused on potential new sources of energy as well as improvement of other existing alternative energy sources. For example, efforts to improve solar technology, wind energy production, bio-fuel production and hydrogen production are all ongoing. However, as those of ordinary skill in the art will recognize, all of these efforts are met with various obstacles, some economical, some political, and some scientific.

As such, it is an ongoing desire to provide new sources of energy, to improve energy extraction efforts, and to improve existing processes and techniques so as to provide energy more efficiently, more abundantly, and in a more environmentally friendly manner.

BRIEF SUMMARY OF THE INVENTION

Embodiments of the present invention are related reactors used in the production of gasses as well as systems and processes in which the reactors may be used. Additionally, various embodiments of the present invention are related to components used in reactors. In accordance with one embodiment of the present invention, a reactor is provided. The reactor includes a furnace and a crucible positioned for heating by the furnace, the crucible defining an interior volume. A downtube is disposed at least partially within the interior crucible along an axis and at least one structure is coupled with the downtube and extends substantially across the cross-sectional area of the interior volume taken in a direction substantially perpendicular to the axis. A plurality of holes is formed in the structure enabling fluid flow therethrough.

In one embodiment, the downtube may include a first opening at a first end of the downtube and a plurality of openings within a wall of the downtube adjacent the first opening. Each of the plurality of openings may be smaller than the first opening.

In another embodiment, structure coupled with the downtube includes a lower body portion and an upper body portion coupled with the lower body portion, wherein the plurality of holes is formed in the lower body portion adjacent to, and radially outward from, a periphery of the upper body portion. In one particular embodiment, the at least one structure may exhibit a substantially bell-shaped geometry.

In accordance with another embodiment of the present invention, a gas processing system is provided. The system includes a supply of oxidizing material, a supply of hydrocarbon material and a reactor. The reactor includes a furnace and a crucible positioned for heating by the furnace. The crucible defines an interior volume and has a catalyst material disposed therein. A downtube is disposed at least partially within the interior crucible along an axis. The downtube has a first end and a second end, the first end being in fluid communication with the supply of oxidizing material and the supply of hydrocarbon material. The second end of the downtube provides an outlet into the interior volume of the crucible. At least one structure is coupled with the downtube and extends substantially across the cross-sectional area of the interior volume taken in a direction substantially perpendicular to the axis. The at least one structure has a plurality of holes formed therein enabling fluid flow through the at least one structure. In one embodiment the at least one structure may include a plurality of structures disposed at different elevations within the crucible.

In one particular embodiment, the catalyst material may include a salt such as sodium carbonate, the oxidizing material may include water, and the hydrocarbon material may include a residual bitumen.

In accordance with another embodiment of the present invention, a column for use in the interior volume of a crucible of a reactor is provided. The column includes a downtube having a first end and a second end and extending along an axis. At least one structure is coupled with the downtube between the first end and the second end. The at least one structure includes a body having a substantially concave surface and a pit rainy of openings formed within the body to enable fluid flow from one side of the at least one structure to another side of the at least one structure.

In one particular embodiment the at least one structure includes a first body portion exhibiting a substantially cup-like shape and exhibiting a cross-sectional diameter of a first dimension. The structure may further include a second body portion exhibiting a substantially cup-like shape and exhibiting a cross-sectional diameter of a second dimension, the second dimension being larger than the first dimension. The first body portion may be coupled to the second body portion along the axis in a concentric manner. The plurality of openings may be formed in the second body portion at a location adjacent to, and radially outward relative to, a periphery of the first body portion.

In accordance with yet another embodiment of the present invention, a method is provided for controlling a reaction within a reactor. The method includes providing a salt bath within a crucible. An oxidizing material and a hydrocarbon material are each introduced into the salt bath at a location near the lowest elevation of the crucible. Gasses produced by at least one of the salt bath, oxidizing material and hydrocarbon material are flowed upward through the salt bath in an impeded manner. In one particular embodiment, the salt bath may be provided as sodium carbonate, the oxidizing material may be provided as water and the hydrocarbon material may be provided as a residual bitumen.

In one embodiment, the flowing of gasses upward through the salt bath in an impeded manner may further include placing at least one structure within an interior volume of the crucible such that it extends substantially through a cross-section thereof. The at least one structure may have a substantially concave surface and a plurality of openings formed therein enabling fluid communication from one side of the at least one structure to another side of the at least one structure.

Other various components and acts may be included in these apparatuses, systems and methods as described below and as will be appreciated by those of ordinary skill in the art.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Significant effort has been focused on energy conversion, energy efficiency, and the optimal use of resources in meeting the energy demands of mankind. The present disclosure describes reactors and that may be used in extracting an energy source (e.g., hydrogen or other gases) from a given material. Various components and methods associated with such reactors are also set forth herein. One embodiment of the present invention described herein includes an alkaline metal reactor that processes materials in a manner referred to as alkaline metal reforming (AMR). However, various aspects of the described inventions may be applicable to a spectrum of energy conversion.

One benefit of using an AMR process is that a wide range of feed materials may be reformed into a more useful energy source. Feed materials generally include an oxidizing material and some form of hydrocarbon, though straight carbon is also useable. In one embodiment, the hydrocarbon material may include a residual bitumen material that is sometimes referred to as "resid". Resid material may also sometimes be referred to as vacuum residuum (VR). Resid or VR materials are similar to road tar or asphalt and may be produced during the vacuum distillation of crude oil. These materials are generally perceived has having a low economic value. Resid composition is largely carbon with a small percentage of hydrogen, even less sulfur and other trace elements as will be recognized by those of ordinary skill in the art.

In accordance with one AMR process of the present invention, used waste products and water may be fed into an alkali metal salt bath at high temperatures. The resulting chemistry reaction will produce hydrogen, carbon monoxide, and carbon dioxide, along with a few other less significant gases. A high temperature furnace may be used to heat a crucible containing the salt bath. Once the desired temperatures are reached, both the resid and water are introduced into the salt bath, which acts as a catalyst to produce the desired gas products. The resulting gases can be separated and marketed as pure gases, i.e. hydrogen, carbon monoxide, and carbon dioxide. Alternately, the gases can be combined into a synthesis gas (syngas) used to produce fertilizers, chemicals, fuels, and other products. An example of such a process is set forth in U.S. patent application Ser. No. 13/188,167 entitled SYSTEM AND PROCESS FOR THE PRODUCTION OF SYNGAS AND FUEL GASSES, filed on even date herewith, the disclosure of which is incorporated by reference herein in its entirety.

Figure 1:
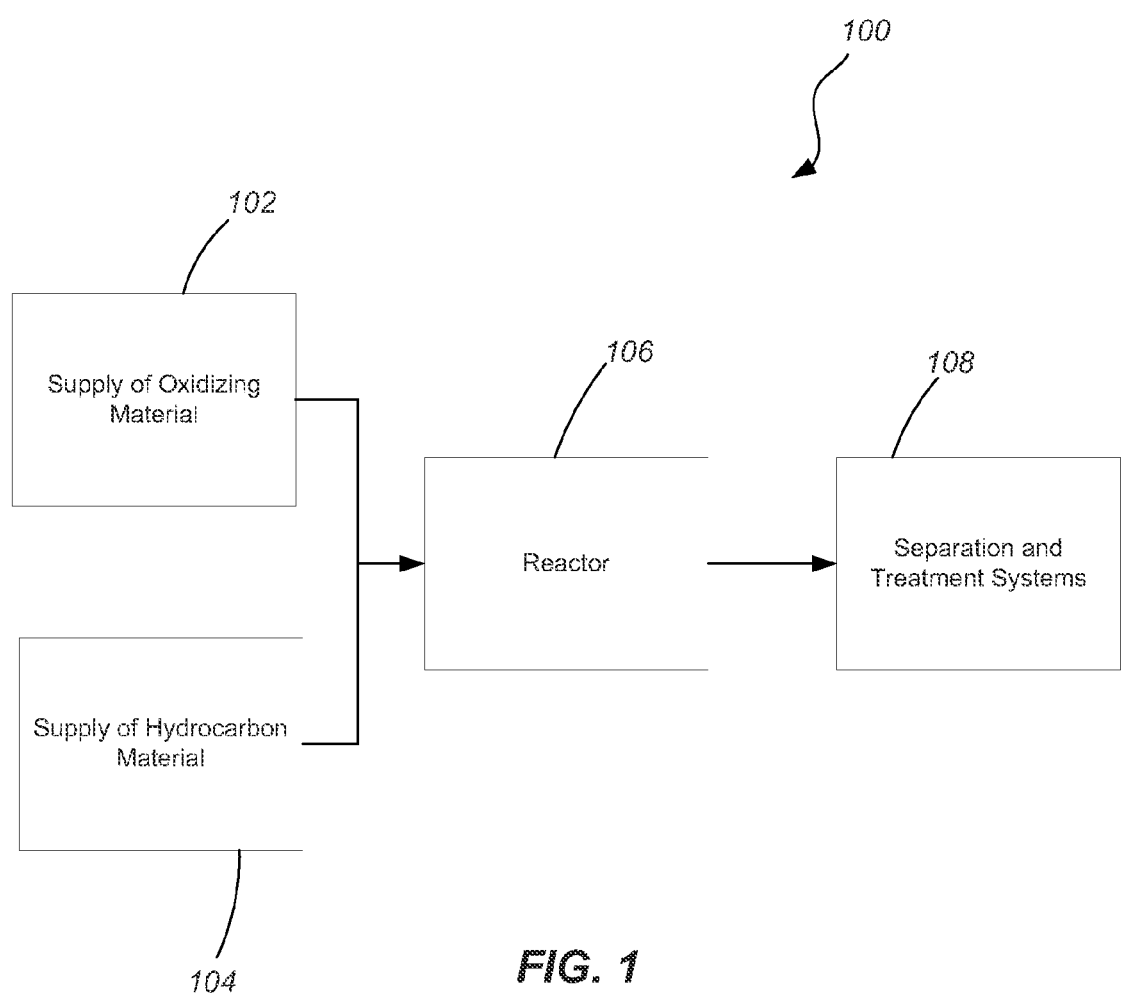
FIG. 1 is a flow diagram showing a process and system for the production of gasses in accordance with an embodiment of the invention.

Referring first to FIG. 1, a general overview of a system 100 and process is shown for the production of gasses using feed materials such as described above. The system 100 includes a source or supply of an oxidizing material 102. In one embodiment, the supply of oxidizing material 102 may include conditioned water that is maintained with a desired chemistry and at a desired temperature and pressure. The system 100 additionally includes a source or supply of hydrocarbon material 104. As noted above, the supply of hydrocarbon material 104 may include resid material. In other embodiments, different oxidizing and hydrocarbon materials may be utilized. As with the source of oxidizing material 102, the source of hydrocarbon material 104 may be maintained in specified conditions (e.g., temperature and pressure) in preparation for introduction into the reactor 106.

The reactor 106, which will be described in further detail below, may include a molten bath of salt or other material into which the oxidizing material and the hydrocarbon material will be introduced for reaction herewith. In one embodiment, the molten salt may include sodium carbonate, the hydrocarbon may be supplied as a resid material, and the oxidizer may include water in steam form. The chemical reaction that takes place within the reactor 106 produces gasses, liquids and solids. Various separation and treatment systems 108 may be used to separate and treat these products and to provide desired products such as, for example, hydrogen, methane, and other gasses. Water, salt and other products may also be separated out and recycled back to the reactor 106. Various controls may be used in association with the system such as described, for example, in the previously incorporated U.S. patent application entitled SYSTEM AND PROCESS FOR THE PRODUCTION OF SYNGAS AND FUEL GASSES.

Figure 2:
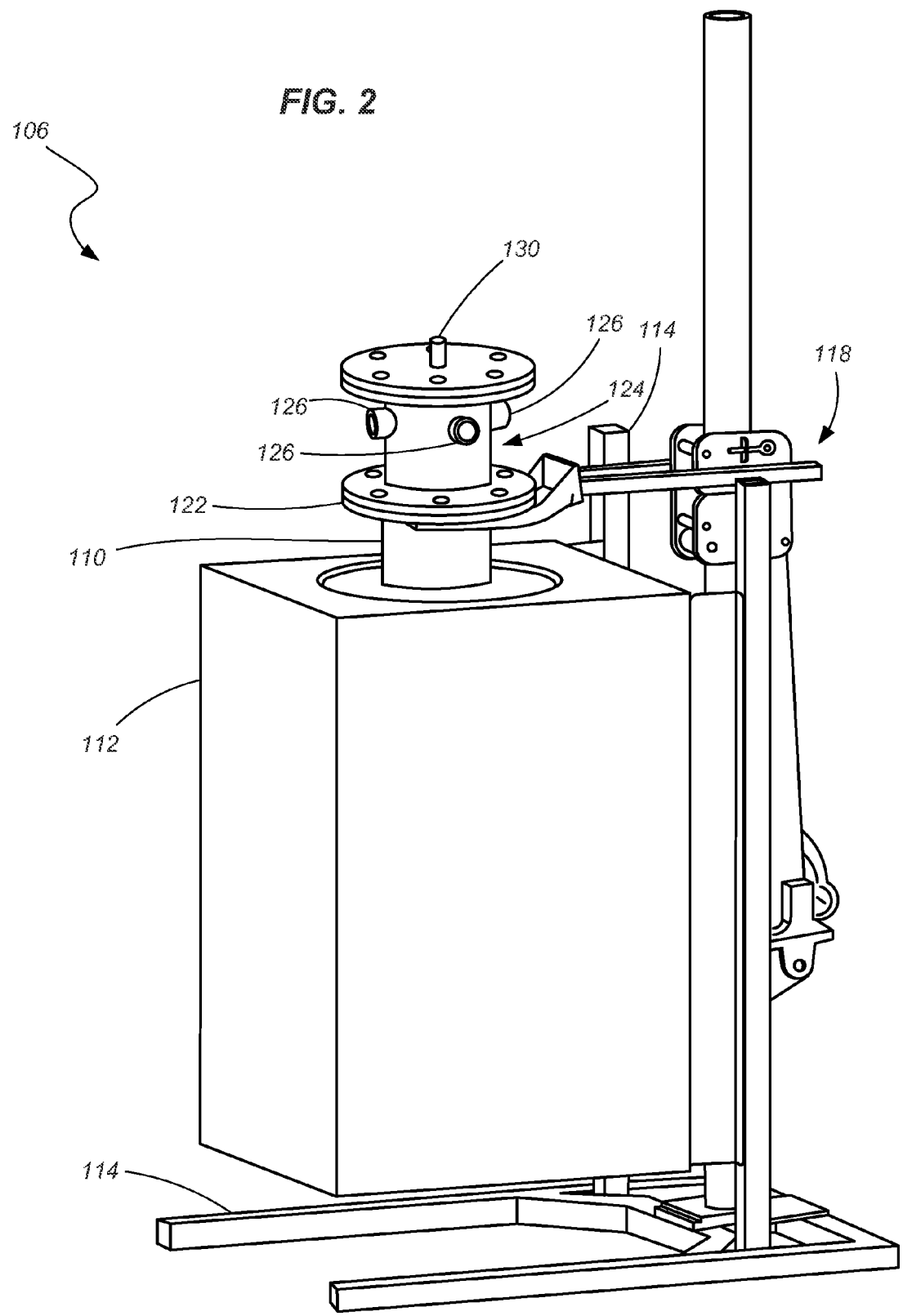
FIG. 2 is a perspective view of a reactor in accordance with an embodiment of the present invention.
Figure 3:
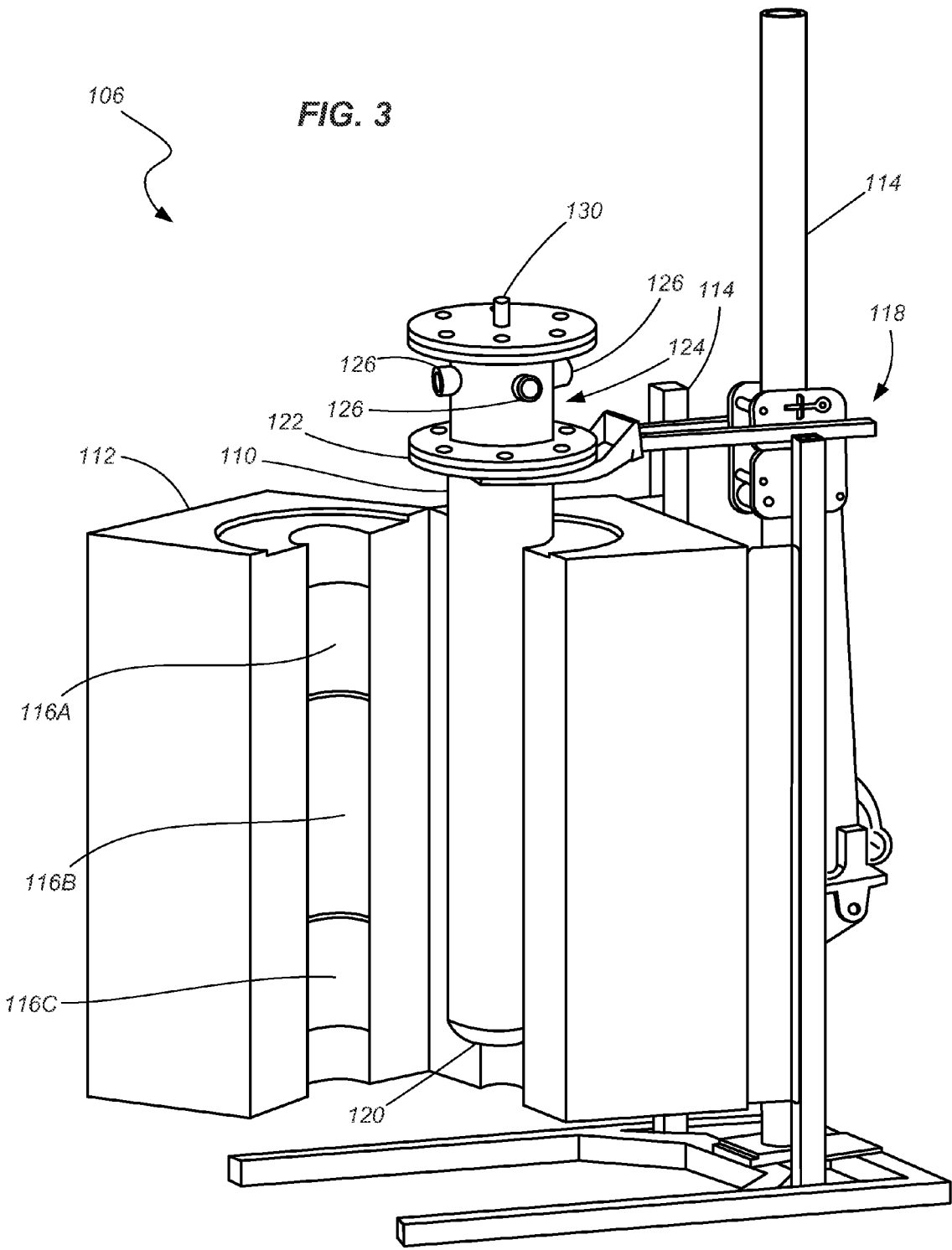
FIG. 3 is a perspective view of the reactor shown in FIG. 1 showing a partial cross-section of one of the reactor's components.

Referring now to FIGS. 2 and 3, a reactor 106 is shown in accordance with an embodiment of the present invention. FIG. 2 shows a perspective view of the reactor 106 while FIG. 3 shows the same reactor 106 with one of the components depicted being "split" in cross-section to show additional details. The reactor 106 includes a crucible 110 disposed within a furnace 112 that is mounted to a frame 114. The furnace 112 may include a commercially available furnace such as, for example, a model XST-6-0-24-3C, three zone hinged vertical tube furnace available from Carbolite, Inc. of Watertown, Wis. In one embodiment, the furnace 112 may be configured to heat the crucible and its contents to a temperature of approximately 900° C. to approximately 930° C. or greater within a desired time period. Additionally, the furnace 112 may include have multiple zones, shown as zones 116A-116C (FIG. 3) that are individually controllable to enable focused heating at specified locations along the length of the crucible 110. While three different zones 116A-116C are shown in FIG. 3, furnaces with more or fewer zones may be utilized.

A lifting mechanism 118 may be associated with the frame 114 to position and hold the crucible 110 at a desired elevation relative to the furnace 112. The lifting mechanism 118 may also be configured to lift the crucible out of the furnace 112 when desired for cleaning, repair or replacement.

Figure 6:
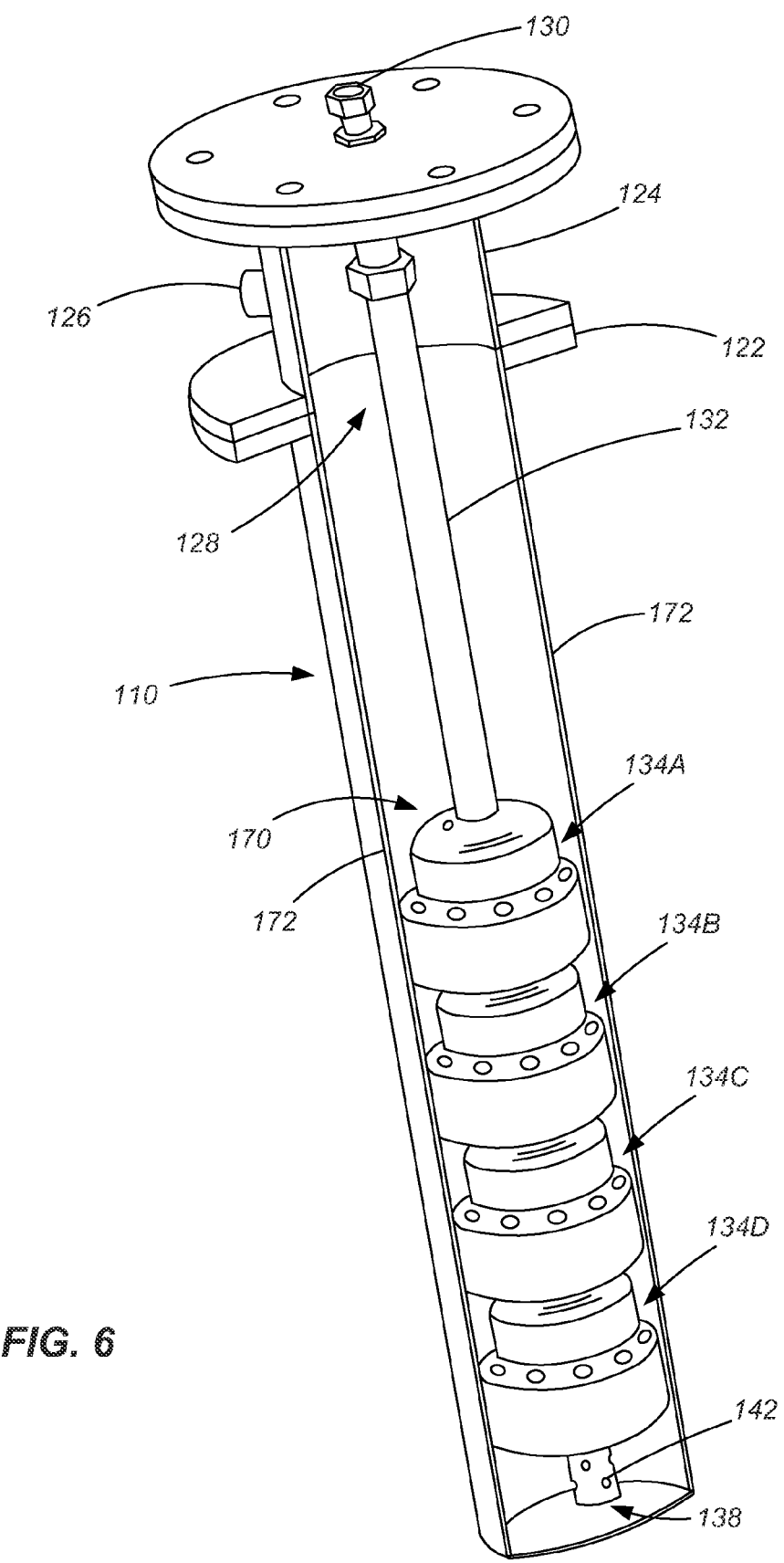
FIG. 6 is a partial cross-sectional view of various components of a reactor in accordance with an embodiment of the present invention.

The crucible 110 may be formed as a substantially cylindrical member. For example, in one embodiment the crucible 110 may be formed from 304 stainless steel pipe having a cap 120 at one end and a flange 122 at the other end for connection with input and output systems. In certain embodiments, the crucible 110 may be approximately 3 feet long and formed of 3 inch or 5 inch schedule 10 pipe. Referring briefly to FIG. 6 in conjunction with FIGS. 2 and 3, an exhaust gas spool 124 is coupled with the upper flange 122 of the crucible 110. The spool 124 may be configured with one or more gas outlets 126 to exhaust gasses produced by reactions taking place within the crucible 110. Additionally, the spool 124 may be configured to support internal components such as will be described in further detail below. One or more inlets 130 may be associated with the spool for receiving various materials such as the oxidizing material (e.g., water/steam and the hydrocarbon material (e.g., resid). These materials may be mixed prior to being introduced into the crucible 110, or they may be introduced separately as individual components for mixing and reacting within the crucible 110. In some embodiments, the spool 124, the inlets 130 and outlets 126 may be covered with an insulating material or even wrapped with a heating element (e.g., tubing conveying with a thermally conductive medium, electrical heat tape or other heating devices) to assist in maintaining any fluids flowing therethrough at a desired temperature.

Figure 4:
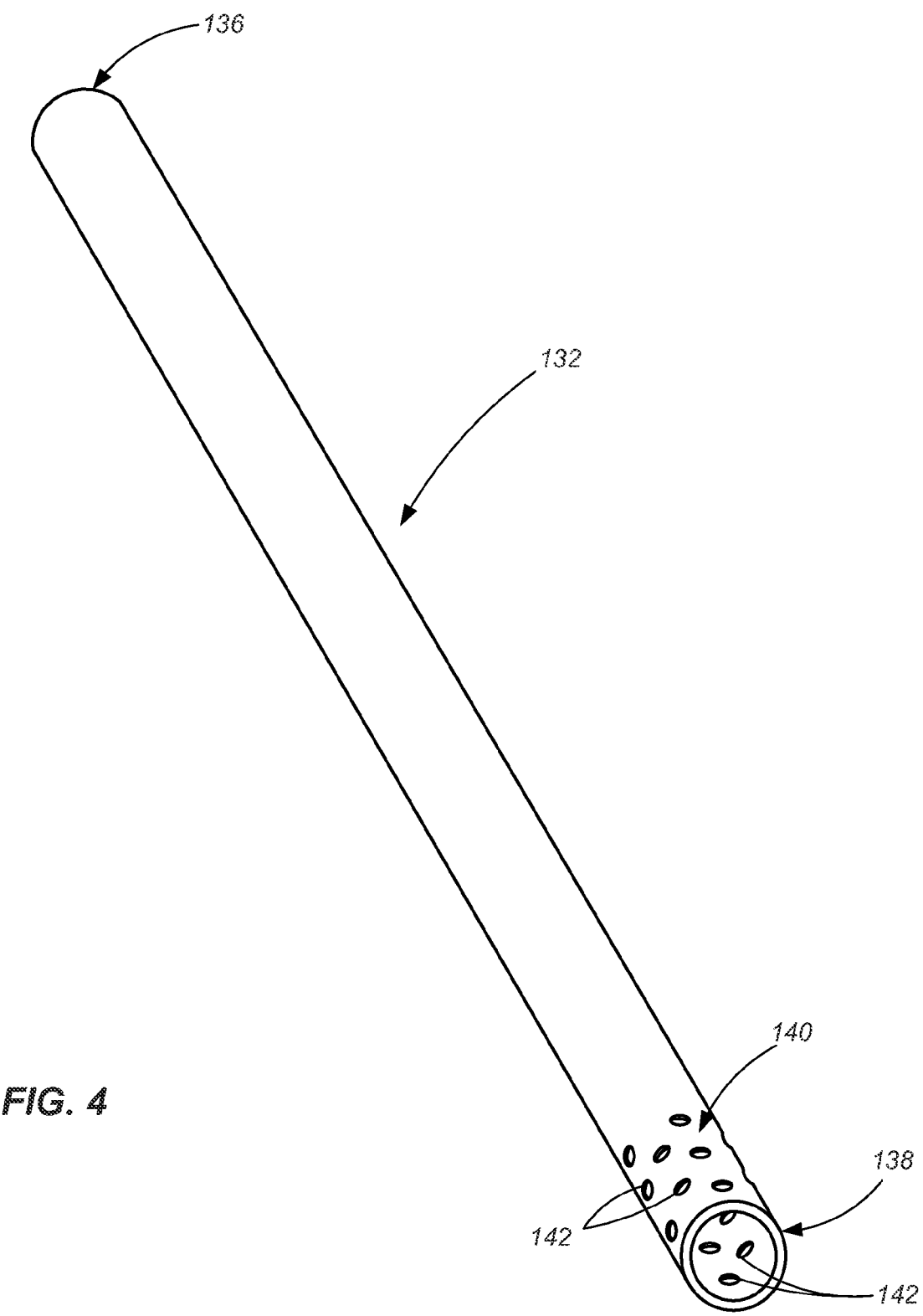
FIG. 4 is a perspective view of a component that may be used in the reactor shown in FIGS. 1 and 2 in accordance with an embodiment of the present invention.
Figure 5:
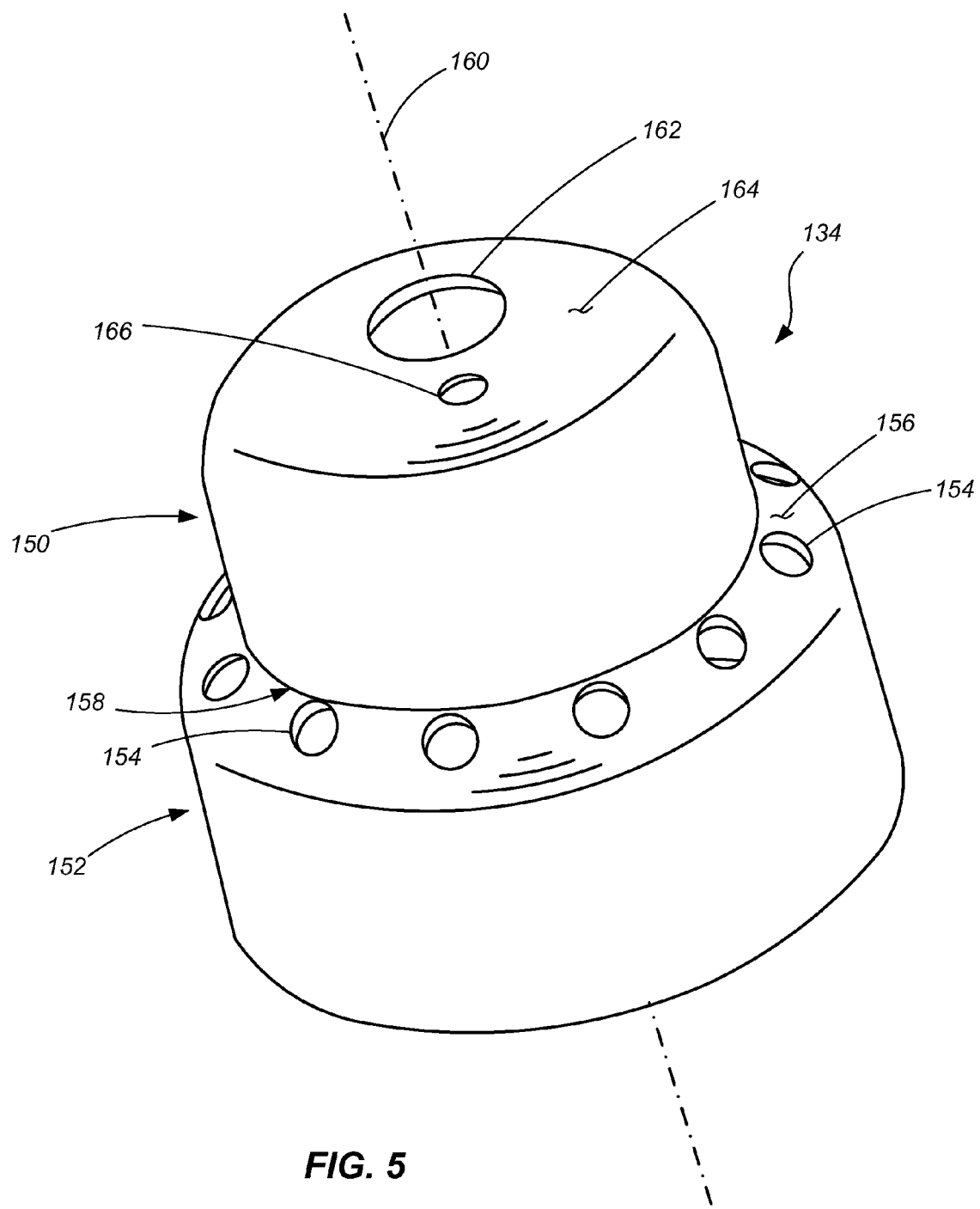
FIG. 5 is a perspective view of a component that may be used in the reactor shown in FIGS. 1 and 2 in accordance with an embodiment of the present invention.

Referring to FIGS. 4 through 6, various internal components positioned within the crucible are shown and described. FIG. 4 shows a perspective view of a tube structure, referred to herein as a downtube 132. FIG. 5 shows a perspective view of a structure, referred to herein as a bell 134, that is used to enhance the mixing, distribution and residence time of oxidizing materials and hydrocarbon materials within the molten salt bath. FIG. 6 shows a perspective view of a crucible 110, the body of the crucible being shown in cross-section, with the down tube 132 and a plurality of bells 134 installed therein.

As shown in FIGS. 4 and 6, the downtube 132 is a conduit used to convey materials from the supply (e.g., the source of oxidizing material 102 and the source of hydrocarbon material 104) into the crucible 110 at a desired elevation within the molten salt bath. The downtube 132 may be a pipe or tube formed of a material that is able to withstand corrosive environments, high temperatures and high pressures. For example, the downtube 132 may be formed of a stainless steel material. A first end 136 of the downtube 132 may be structurally coupled with the spool 124 and placed in fluid connection with the inlets 130 of the spool 124. A second end 138 of the downtube 132 may be open and the sidewall 140 of the downtube near the second end 138 may include a plurality of openings 142 or apertures therein.

For example, in one embodiment, there may be approximately sixteen (16) openings 142 that are generally circular and that measure approximately ¼ inch in diameter. In one particular embodiment, the openings 142 may be formed in multiple rows (e.g., four rows as shown in FIG. 4), with the first row having the openings centered approximately ½ inch from the second end 138 of the downtube 132. Each row may be spaced with the center of the openings 142 being approximately ½ inch from each adjacent row. Each row of openings, for example, may include four openings 142 positioned about the downtube at about 90° intervals. The openings 142 of each row may be rotated, relative to adjacent rows, by a desired amount (e.g., approximately 45° when each row includes four openings 142 positioned at 90° intervals). Of course other configurations are contemplated and the number and size of the openings 142, as well as the distance located from the second end 138 of the down tube 132, are not limited to the example set forth above or shown in the drawings.

The openings 142 facilitate the distribution of feed materials, particularly when in gas form, into the molten salt bath. The openings 142 enable the gas to pass into the molten salt bath as relatively small bubbles, preventing large gas bubbles from exiting the second end 138 of the downtube 132. The actual number of openings 142, their size, shape and location may be determined based, at least in part, on an expected flow rate of materials in an effort to minimize or prevent gas from exiting the open second end 138 of the downtube 132.

Referring briefly to FIGS. 5 and 6, in one embodiment the bells 134 may include structure shaped generally like a belt with an upper body portion 150 and a lower body portion 152. Both upper and lower body portions 150 and 152 exhibit an inverted cup or bowl shape (i.e., a concave surface) with the upper body portion 150 exhibiting a smaller diameter than that of the lower body portion 152. The lower body portion 152 is open at its bottom end (i.e., the end opposite that to which the upper body portion 150 is attached) and has a plurality of openings 154 or apertures formed in an upper surface 156 of the lower body portion 152. The lower periphery 158 of the upper body portion 150 is coupled to the upper surface 156 of the lower body portion 152 adjacent the plurality of openings 154 such that the upper and lower body portions 150 and 152 are concentrically positioned about a longitudinal axis 160 extending therethrough.

An opening 162 is formed in the upper surface 164 of the upper body portion 150, and a concentric opening, while not shown, is formed in the upper surface 156 of the lower body portion 152. The opening 162 in the upper body portion 150 is sized and configured so as to receive the downtube 132 therethrough along the longitudinal axis 160. The concentric opening in upper surface 156 of the lower body portion 152 is sized to be substantially the same size as the inside cross sectional opening (e.g., diameter) of the upper body portion 150. An additional opening 166 may be formed within the upper surface 164 of the upper body portion 150. This opening 166 facilitates removal of the bell column downtube from the crucible 110 without trapping hydrogen or other gasses within the bells 134. Additionally, this opening facilitates the insertion of various instruments (e.g., a thermocouple or other sensors) into the salt bath.

The bells 134 may be formed of materials similar to that of the downtube 132 and the crucible. In one embodiment, the bells 134 may be formed by welding two pipe end caps together in the manner shown. However, the bells 134 may be formed by other processes (e.g., stamping, molding, etc) and may exhibit different shapes that that which is explicitly shown in the drawings. For example, in one embodiment, the bells 134 may include only a single body portion (e.g., the lower body portion 152) with all relevant openings being formed therein.

As seen in FIG. 6, several bells 134 may be disposed on the downtube 132 within the body of the crucible 110. While four bells 134 are shown in the assembly depicted in FIG. 6, configurations using additional or fewer bells may be used. This assembly, referred to herein as the bell column 170, provides various advantages to the production of gasses within the reactor 106 as will become apparent from the further description below.

Referring generally to the drawings, during operation of the reactor 106, the crucible 110 may be filled to a desired level with a salt other material used as a catalyst. For example, in one embodiment the crucible 110 may be filled from about ½ to about ½ full of the desired salt constituents (e.g., sodium carbonate). The furnace 112 will bring the crucible 110 and its contents to a desired temperature to melt the salt to create a molten salt bath. Once the salt melts and becomes fluid, the internal structure (e.g., the downtube 132 and associated components) assists in managing or controlling the fluid actions when water and resid (or other feed materials) are added. For example, as these feed materials come in contact with the hot salt, bubbling, rolling and splashing will occur within the salt bath. If the splashing is not controlled in some manner, the salt will splash into the upper surfaces of the crucible (i.e., above the level of the salt bath) and solidify because of contact with the relatively colder surfaces. Over a period of time, this can cause reduced molten salt levels, and possibly impede or totally prevent gas flows. Among other things, the bell column 170 helps to alleviate, if not eliminate, this potential issue.

The down tube 132 of the bell column 170 provides a path for both the resid and water (or other feed materials) to be delivered to the lowermost portion of the salt melt so that the initial introduction of feed materials occurs at the depths of the salt bath and not at the surface. Water, in steam form, and resid will be delivered to the bottom of the crucible 110 through the center of the downtube 132. The downtube 132 provides an unobstructed path to deliver the feed materials underneath the salt bath. It may also provide some mixing of the feed materials. The water and resid then work their way back up the salt bath disposed within the crucible 110 between the downtube 132 and wall 172 of the crucible 110. Gasses formed during the reaction of the feed materials and the salt bath are vented out the top of the crucible through the outlets 126 formed in the spool 124.

In general, the water component changes the sodium carbonate to sodium hydroxide, which in turn breaks down the resid which contains carbon. The interaction between resid and sodium hydroxide turn the hydroxide back to sodium carbonate. However, if the water and resid travel too quickly through the salt bath, the desired gas production becomes time limited. In other words, if the resid and water do not spend enough time in the salt bath, there will not be an effective conversion to the desired gaseous components. In such a situation, the steam will pass through the salt bath partially consumed and exit the crucible as steam. Additionally, the conversion of the salt from carbonate to hydroxide will be incomplete and inadequate. The resid will give up its volatile components while the remaining carbon component of the resid will sit in the bottom of the bath only partially consumed.

The bell column 170 is structured to control and manage the residence time of the feed materials within the salt bath. As the feed materials are introduced into the salt bath, bubbles will be produced and the upper level of the salt bath will rise within the crucible 110 such that it will move up. In operation, the amount of salt used will be such that the upper level or surface of the resulting salt bath will reach a level that is approximately at the same elevation as the bottom of the upper most bell 134A. One of the functions of this upper belt 134A is to provide a liquid salt splash guard and limit the amount of salt that splashes onto the wall 172 of the crucible 110.

As resid and water are injected into the downtube 132, pressure builds until the water and resid can overcome the load of the salt bath and begin to exit the bottom of the downtube 132. The water, now in gas form, and vaporized resid gases will exit the downtube 132 through the side openings 142 just above the second end 138 of the downtube 132. These openings 142 will prevent the gases from belching in large bubbles out the larger opening at the second end 138 of the downtube 132. The smaller bubbles exiting the openings 142 will travel up through the salt bath and become trapped by the lowest bell 134D.

Any solids (such as carbon particles and metal impurities) within the feed materials will exit through the larger opening at the second end 138 of the downtube 132 into the salt bath. These solids can then interact with the salt bath and become dissolved to create various gases. However, some of the solids will not dissolve and will remain on the bottom of the crucible as so-called "clinkers."

The gas bubbles will continue to exit the downtube 132 and the gas will build under the lowest bell 134D until enough gas is trapped within the lower body portion 152 of the lowest bell 134D to begin escaping through the small holes 154. Some gas may also escape through the single opening 166 on the upper surface 164 of the upper body portion 150. As noted above, this single opening 166 may also be used to accommodate one or more thermocouples or other measuring devices used to monitor and controlling the temperature within the crucible 110. Thus, any gas travelling through these holes 160 may be within the limited space left after insertion of such measuring devices.

The gas continues to build within each successive bell (i.e., through bell 134C, then bell 134B and then the highest bell 134A). This cascading of bubbles up through the bells 134A-134D provides a desired mixing of the feed materials with the salt bath and will improve the resident time of the water and off gasses from the resid resides within the salt bath by providing a more tortuous path for these materials. To do so, the diameter of the lower body portion 152 of the bells 134 may be configured to be substantially similar as the internal diameter of the crucible 110. If other geometries are used, the cross-sectional areas of the bells and crucible, as taken substantially perpendicular to the axis 160, may be similar. Stated another way, the bells 134 are configured to substantially extend across the cross-sectional area of the crucible 110 as taken in a direction that is substantially perpendicular to the longitudinal axis 160 such that little, if any, gas travels up between the bells 134 and the wall 170 of the crucible.

It is noted that the bell column 170, including both the downtube 132 and the bells 134, will produce smaller bubbles and provide more surface area for the gases to act upon. The size and number of the openings 154 may be tailored to provide a desired bubble size and residence time of the gasses. Additionally, and as indicated above, the bells 134A-134D will help to prevent any violent fluctuations of the salt bath from reaching the upper regions of the crucible. Thus, the reactor 106 provides increased gas output and more efficiently manages the reactions of the feed materials and the salt bath within the crucible.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives failing within the spirit and scope of the invention as defined by the following appended claims.

What is claimed is:

1. A method of controlling a reaction within a reactor, the method comprising:
   providing a salt bath within a crucible;
   introducing an oxidizing material and a hydrocarbon material into the salt bath at a location near the lowest elevation of the crucible;
   flowing gasses produced by at least one of the salt bath, oxidizing material and hydrocarbon material upward through the salt bath through a structurally obstructed flow path,
      wherein flowing gasses through a structurally obstructed flow path includes positioning at least one downwardly concave structure in the crucible, the at least one downwardly concave structure having a plurality of openings formed therein.

2. The method according to claim 1, wherein providing a salt bath within a crucible includes providing a salt bath containing sodium carbonate.

3. The method according to claim 2, wherein introducing an oxidizing material and a hydrocarbon material into the salt bath includes introducing water and residual bitumen into the salt bath.

4. A method of controlling a reaction within a reactor, the method comprising:
   providing a salt bath containing sodium carbonate within a crucible;
   introducing an oxidizing material comprising water and a hydrocarbon material comprising residual bitumen into the salt bath at a location near the lowest elevation of the crucible;
   flowing gasses produced by at least one of the salt bath, oxidizing material and hydrocarbon material upward through the salt bath in an impeded manner;
      wherein flowing gasses upward through the salt bath in an impeded manner includes placing at least one structure within an interior volume of the crucible such that it extends substantially through a cross-section thereof, the at least one structure having a substantially concave surface and a plurality of openings formed therein enabling fluid communication from one side of the at least one structure to another side of the at least one structure.

5. The method according to claim 4, wherein placing at least one structure within an interior volume of the crucible includes placing a plurality of structures within the interior volume of the crucible at different elevations.

6. The method according to claim 1, wherein introducing an oxidizing material and a hydrocarbon material into the salt bath at a location near the lowest elevation of the crucible includes flowing the oxidizing material and the hydrocarbon material through a downtube, including flowing gasses produced by the oxidizing material and the hydrocarbon material through a plurality of openings in a sidewall of the downtube.

7. The method according to claim 3, further comprising reacting the water and the sodium carbonate to produce sodium hydroxide.

8. The method according to claim 7, further comprising reacting the sodium hydroxide with the residual bitumen to produce sodium carbonate.

9. The method according to claim 1, further comprising removing gasses produced by at least one of the salt bath, oxidizing material and hydrocarbon from the crucible.

10. The method according to claim 9, further comprising separating the removed gasses and producing individual gas streams including a hydrogen gas stream.

11. The method according to claim 10, wherein producing individual gas streams includes producing at least one of a carbon monoxide stream and a carbon dioxide stream.

12. The method according to claim 1, further comprising forming the at least one downwardly concave structure to exhibit a substantially bell shaped geometry.

13. The method according to claim 12, further comprising forming the at least one downwardly concave structure with an upper body portion and a lower body portion, the upper body portion exhibiting a smaller cross-sectional area than the lower body portion.

14. The method according to claim 13, further comprising forming the at least one lower body portion to exhibit a cross-sectional area that is substantially complementary with a cross-sectional area of the crucible.

15. The method according to claim 14, further comprising providing at least some of the plurality of openings in the lower body portion.

16. A method of controlling a reaction within a reactor, the method comprising:
   providing a salt bath within a crucible;
   introducing an oxidizing material and a hydrocarbon material into the salt bath at a location near the lowest elevation of the crucible;
   flowing gasses produced by at least one of the salt bath, oxidizing material and hydrocarbon material upward through the salt bath through a structurally obstructed flow path, wherein flowing gasses through a structurally obstructed flow path includes positioning a plurality of downwardly concave structures within the interior volume of the crucible at different elevations.

* * * * *